(12) United States Patent
Kobler

(10) Patent No.: US 7,034,281 B2
(45) Date of Patent: Apr. 25, 2006

(54) POSITION ENCODER FOR MEASURING THE POSITION OF TWO OBJECTS MOVABLE RELATIVE TO ONE ANOTHER

(75) Inventor: Alexander Kobler, Burgkirchen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 180 days.

(21) Appl. No.: 10/393,161

(22) Filed: Mar. 20, 2003

(65) Prior Publication Data

US 2003/0178557 A1 Sep. 25, 2003

(30) Foreign Application Priority Data

Mar. 21, 2002 (DE) ............................ 202 04 471 U

(51) Int. Cl.
*G01D 5/34* (2006.01)

(52) U.S. Cl. .................................. 250/231.13; 341/13
(58) Field of Classification Search ........... 250/231.13, 250/231.18, 237 G, 339.14, 491.1; 341/13; 374/120; 33/706
See application file for complete search history.

(56) References Cited

U.S. PATENT DOCUMENTS

| 5,332,895 A | * | 7/1994 | Rieder et al. | .......... 250/231.14 |
| 5,705,810 A | * | 1/1998 | Wang et al. | ........... 250/231.13 |
| 5,836,694 A | * | 11/1998 | Nguyen | ...................... 374/130 |
| 5,956,659 A | * | 9/1999 | Spies et al. | .................... 702/94 |
| 2003/0007545 A1 | * | 1/2003 | Hashimoto et al. | ......... 374/120 |

FOREIGN PATENT DOCUMENTS

| JP | 404191647 A | * | 7/1992 |
| JP | 7-43177 | | 2/1995 |

* cited by examiner

Primary Examiner—Seung C. Sohn
(74) Attorney, Agent, or Firm—Kenyon & Kenyon LLP

(57) ABSTRACT

A position encoder is used to measure the position of two objects which are movable relatively to one another, and, for this purposes, includes a position-detection arrangement via which positional data are generated. In addition, the position-measuring device has at least one temperature sensor, which is used for measuring the temperature at at least one measuring point of the two objects, which are movable relative to each other, and for generating temperature data. The temperature sensor is configured as an infrared sensor which measures in a contactless manner and may be mounted in a housing of the position encoder. The position encoder is used, for example, in conjunction with an electric drive.

19 Claims, 1 Drawing Sheet

POSITION ENCODER FOR MEASURING THE POSITION OF TWO OBJECTS MOVABLE RELATIVE TO ONE ANOTHER

CROSS-REFERENCE TO RELATED APPLICATIONS

The present application claims priority to Application No. 202 04 471.8, filed in the Federal Republic of Germany on Mar. 21, 2002, which is expressly incorporated herein in its entirety by reference thereto.

FIELD OF THE INVENTION

The present invention relates to a position encoder.

BACKGROUND INFORMATION

Japanese Published Patent Application No. 7-43177 describes a position encoder designed as a rotary transducer for an electric drive. Besides position-detection means for determining the position of two drive parts, which are movable relatively to one another, the rotary transducer also includes a temperature sensor. The temperature sensor, the design of which is not described in detail, is used to measure the temperature in the housing of the rotary transducer. From this temperature, in conjunction with a preceding reference and/or calibration measurement taken during the actual measuring operation, the drive temperature of interest is inferred. From the temperature estimated in this manner in the drive area, information can be derived regarding a possible overheating of the drive windings and, if indicated, regarding temperature-related problems in the drive area. The disadvantage is, however, that ultimately there is no direct measuring information with respect to the temperature at certain parts of the drive. Accordingly, the temperature information obtained in this manner is assessed as being relatively imprecise.

Besides this variant for determining temperatures in the electric drive area, it is also conventional to position temperature sensors on the drive side which supply measuring information regarding the instantaneous temperatures in the drive area. The temperature sensors used for this purpose are usually designed as semiconductor sensors which are directly integrated in the drive windings. The drawback is that the placement of such temperature sensors necessitates an intervention in the particular drive.

Similar problems arise not only when rotary position encoders are used in combination with drives, but fundamentally when position encoders are used to measure the position of two objects which are movable relatively to one another, and a temperature sensing at one of the two movable objects is required.

SUMMARY

It is an object of the present invention to provide a position encoder, which, in addition to positional data regarding the relative movement of two objects which are movable relatively to one another, also supplies reliable information regarding the temperature at defined measuring points on at least one of the movable objects.

The above and other beneficial objects of the present invention are achieved by providing a position encoder described herein.

The present invention provides for placing an infrared temperature sensor, which functions in a contactless manner, in a housing of the position encoder. In this manner, a direct, reliable temperature measurement may be ensured at one or a plurality of measuring points at at least one of the movable objects.

The position encoder, in accordance with the present invention, may be used in conjunction with electric drives, particularly when the position encoder is configured as a rotary position encoder, in the form of a rotary transducer or encoder. Via the infrared temperature sensor integrated in the rotary transducer, a precise temperature measurement may then be taken at one or more measuring points on the drive side, without any further intervention in the structure of the particular drive. In this manner, the winding temperature on the drive side, for example, may be reliably measured and monitored.

The positional data, together with the temperature data on the position encoder side, are processed for serial transmission, and transmitted via an appropriate interface and a signal-transmission path to a downstream evaluation unit.

As already indicated, the present invention is not limited to rotary position encoders, i.e., linear position encoders may also be designed accordingly, for example. In the same manner, the application is not only possible in connection with drives, but may fundamentally be used for direct, precise temperature sensing at one of the two movable objects.

In addition, position encoders, which are based on different physical sensing methods, for instance optical, magnetic, inductive, or, however, capacitive position encoders, may also be provided in accordance with the present invention.

Further aspects of the present invention and details pertaining thereto are derived from the following description of example embodiments, on the basis of the Figure.

DETAILED DESCRIPTION

Figure 1:
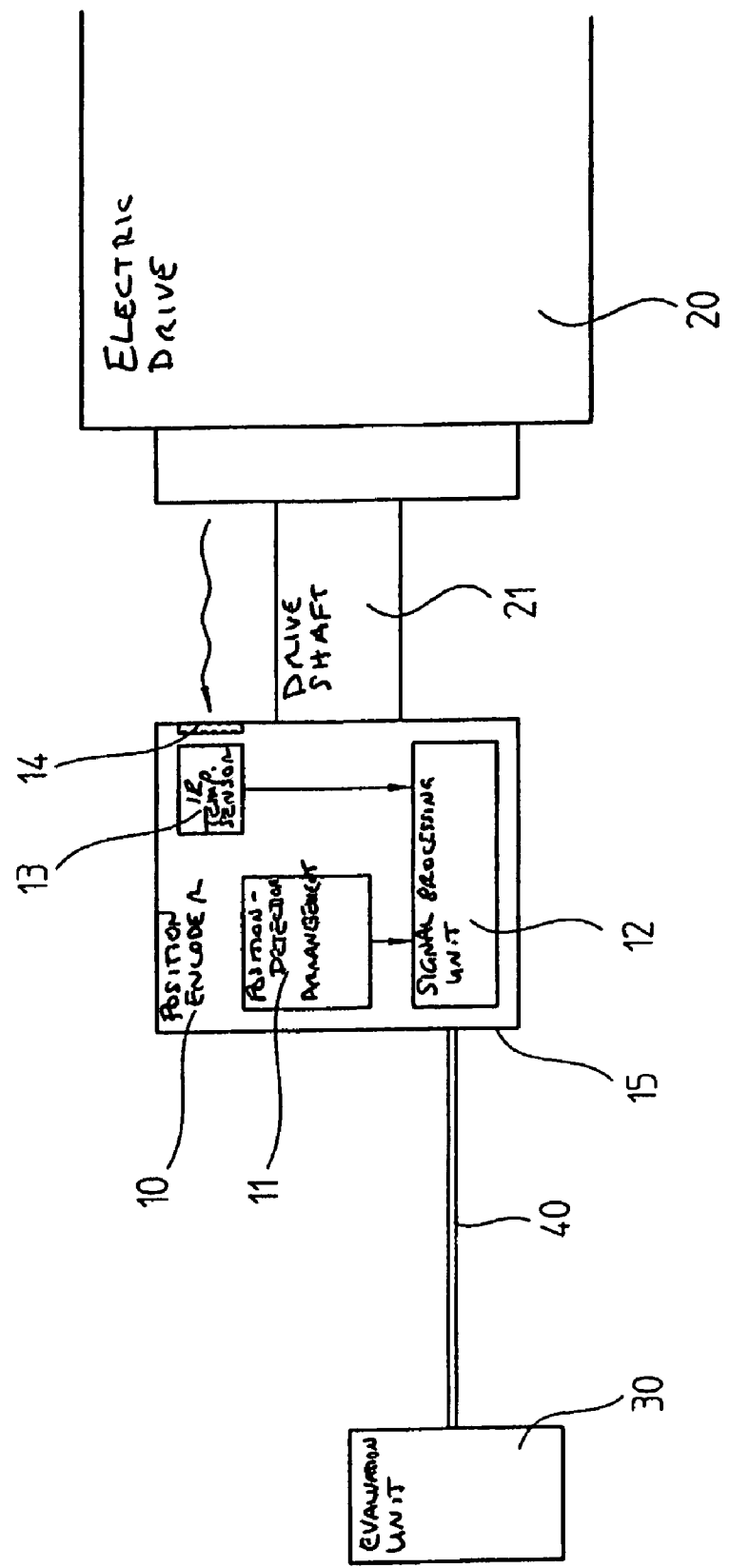
FIG. 1 is a schematic block diagram representation of an exemplary embodiment of position encoder 10 according to the present invention, in combination with an electric drive 20.

Via position measuring device 10, the position of two objects, which are movable relatively to one another, is measured. This example relates to the rotary motion of a rotating drive shaft 21 of an electric drive 20, which has a rotational position relative to the stationary drive part that is monitored. For this, drive shaft 21 is coupled to a rotating code disk on the side of position encoder 10. The code disk has a measuring graduation scale in the form of a circular graduation scale, which is scanned by a scanning unit to generate positional data. In the case of an optical position encoder 10, e.g., a light source, the circular graduation scale includes one or more (optional) scanning gratings, as well as one or more optoelectronic detector elements for picking up, sensing or recording the scanning signals, which are modulated as a function of displacement, respectively positional data. The components of position encoder 10 required for generating the positional data, are schematically illustrated as a position-detection arrangement 11 to indicate that alternative physical scanning principles, such as magnetic, inductive, capacitive, etc. scanning principles, may also be used to generate the positional data.

The positional data generated via the particular position-detection arrangement 11 are transmitted to a signal-processing unit 12 (illustrated schematically), which processes these data for transmission to a downstream evaluation unit 30 via a signal-transmission path 40. Signal-processing unit 12 may be designed as a serial interface. Evaluation unit 30 may include a numerical control, for example, which processes the supplied positional data in order to control or regulate the motor.

In addition, position encoder 10 includes a temperature sensor, which is designed in accordance with the present invention as an infrared temperature sensor 13, which functions in a contactless manner, and is used to measure the temperature at at least one measuring point of the two objects, which are movable in relation to one another, on the side of drive 20. As schematically indicated in FIG. 1, infrared temperature sensor 13 is mounted in housing 15 of position encoder 10, housing 15 having a window region 14 to which infrared temperature sensor 13 is aligned in order to measure the temperature at the desired measuring point. For this purpose, window region 14 of housing 15 is made of a material which is as transparent as possible to the infrared radiation to be detected and which scatters the transmitted radiation to the smallest extent possible. For example, glass, a scratch-resistant material, etc. may be used.

To facilitate the precise alignment of infrared temperature sensor 13, suitable optical elements in the form of lenses, etc. may be mounted in window region 14. In addition, using such optical elements, which are integrated in the window region and have defined optical effects, the exact measuring point may be precisely adjusted to the particular infrared temperature sensor. The available measuring range of the infrared temperature sensor is able to be adapted in this manner, within certain limits, to the particular configuration.

Appropriate non-contacting infrared temperature sensors or pyro-temperature sensors, which may be used within the scope of the present invention, are marketed, for example, by the firm InfraTec GmbH, Dresden.

Thus, via infrared temperature sensor 13, the temperature may be determined in a contactless manner at at least one measuring point on the two objects, which are movable relatively to one another and the relative motion of which is measured by position encoder 10. In the illustrated example of an electric drive 20, an appropriate measuring point may be selected, for example, on the motor windings, in order to measure the winding temperature on the drive side, with such a precision. Depending on the drive type, the motor windings may be configured both on the side of the stationary, as well as on the side of the movable drive part. The measuring-point alignment of infrared temperature sensor 13 in housing 15 of position encoder 10 may be selected accordingly, so as to reflect this difference.

Alternatively to detecting the winding temperature, it may also be provided, for example, to select as a measuring point, at least one point on the surface on one of the drive parts which are movable relatively to one another.

Thus, depending on the particular requirement, it is possible to undertake a contactless, precise temperature measurement at one or more measuring points on the sides of the objects, which are movable relatively to one another, with the aid of infrared temperature sensor 13, and for this measurement to be further evaluated. For this purpose, in the case of an electric drive, for instance, there may be, in particular, no need to intervene in the design of the drive. Infrared temperature sensor 13, which is integrated in position encoder 10, supplies the desired temperature data.

In the illustrated exemplary embodiment, the temperature data produced by infrared temperature sensor 13, as well as the positional data, are supplied to signal-processing unit 12, to be transmitted, as are the positional data, in serial form, to downstream evaluation unit 30. In the present exemplary embodiment, on the basis of the continuously transmitted temperature data, on the side of evaluation unit 30, for instance, the temperature of the motor windings may be monitored, and, in the event of a possible overheating, a warning or error signal may be generated, etc.

Besides the described exemplary embodiment, several alternative variants exist within the framework of the considerations of the present invention. Thus, the application of contactlessly functioning infrared temperature sensors is neither limited to the application in conjunction with electric drives, nor to the rotary position encoder.

What is claimed is:

1. A position encoder configured to measure a position of two objects movable relative to one another, comprising:
    a position-detection arrangement configured to generate positional data;
    at least one temperature sensor configured to measure a temperature at at least one measuring point of the two movable objects and to generate temperature data, the at least one temperature sensor including an infrared temperature sensor configured to measure in a contactless manner; and
    an electric drive on which the position encoder is mounted, the position encoder configured to determine a position of a movable drive part in relation to a stationary drive part;
    wherein at least one point of motor windings at one of the drive parts corresponds to a measuring point to which the infrared temperature sensor is aligned.

2. The position encoder according to claim 1, further comprising a housing with a window region, the infrared temperature sensor mounted in the housing, the infrared temperature sensor aligned with the window region to measure temperature at a desired measuring point.

3. The position encoder according to claim 2, wherein the window region made of a material transparent to infrared radiation.

4. The position encoder according to claim 2, further comprising optical elements having a defined optical effect integrated in the window region.

5. The position encoder according to claim 1, wherein the position encoder includes a rotary position encoder configured to measure a rotational motion of a drive shaft of the drive.

6. The position encoder according to claim 1, wherein at least one point on a surface of one of the drive parts corresponds to a measuring point to which the infrared temperature sensor is aligned.

7. The position encoder according to claim 1, further comprising:
    a downstream evaluation unit;
    a signal-transmission path; and
    a signal-processing unit configured to preprocess the positional data and the temperature data for serial transmission to the downstream evaluation unit via the signal-transmission path.

8. A position encoder configured to measure a position of two objects movable relative to one another, comprising:
    a position-detection arrangement configured to generate positional data; and
    at least one temperature sensor configured to measure a temperature at at least one measuring point of the two movable objects and to generate temperature data, the at least one temperature sensor including an infrared temperature sensor configured to measure in a contactless manner;

wherein the position-detection arrangement includes:

a measuring graduation scale; and a scanning unit, the measuring graduation scale and the scanning unit connected to the objects that are movable relative to each other, the scanning unit configured to generate the positional data by scanning of the measuring graduation scale.

9. The position encoder according to claim 8, further comprising a housing with a window region, the infrared temperature sensor mounted in the housing, the infrared temperature sensor aligned with the window region to measure temperature at a desired measuring point.

10. The position encoder according to claim 9, wherein the window region made of a material transparent to infrared radiation.

11. The position encoder according to claim 9, further comprising optical elements having a defined optical effect integrated in the window region.

12. The position encoder according to claim 8, further comprising an electric drive on which the position encoder is mounted, the position encoder configured to determine a position of a movable drive part in relation to a stationary drive part.

13. The position encoder according to claim 12, wherein the position encoder includes a rotary position encoder configured to measure a rotational motion of a drive shaft of the drive.

14. The position encoder according to claim 8, wherein the position-detection arrangement is affixed stationarily to one of the two objects.

15. A position encoder for measuring a position of two objects movable relative to one another, comprising:

a position-detection means for generating positional data;

at least one temperature sensor for measuring a temperature at at least one measuring point of the two movable objects and to generate temperature data, the at least one temperature sensor including an infrared temperature sensor configured to measure in a contactless manner; and an electric drive on which the position encoder is mounted, the position encoder configured to determine a position of a movable drive part in relation to a stationary drive part;

wherein at least one point of motor windings at one of the drive parts corresponds to a measuring point to which the infrared temperature sensor is aligned.

16. The position encoder according to claim 15, wherein at least one point on a surface of one of the drive parts corresponds to a measuring point to which the infrared temperature sensor is aligned.

17. The position encoder according to claim 15, further comprising:

a downstream evaluation unit;

a signal-transmission path; and a signal-processing unit for preprocessing the positional data and the temperature data for serial transmission to the downstream evaluation unit via the signal-transmission path.

18. A position encoder for measuring a position of two objects movable relative to one another, comprising:

a position-detection means for generating positional data; and at least one temperature sensor for measuring a temperature at at least one measuring point of the two movable objects and to generate temperature data, the at least one temperature sensor including an infrared temperature sensor configured to measure in a contactless manner;

wherein the position-detection means includes:

a measuring graduation scale; and a scanning unit, the measuring graduation scale and the scanning unit connected to the objects that are movable relative to each other, the scanning unit configured to generate the positional data by scanning of the measuring graduation scale.

19. The position encoder according to claim 18, wherein the position-detection means is affixed stationarily to one of the two objects.

* * * * *